(12) United States Patent
Miyamori et al.

(10) Patent No.: US 9,897,756 B2
(45) Date of Patent: Feb. 20, 2018

(54) FUSION-SPLICING METHOD AND FUSION SPLICER

(71) Applicant: SEI Optifrontier Co., Ltd., Yokohama-shi, Kanagawa (JP)

(72) Inventors: Makoto Miyamori, Kanagawa (JP); Hideaki Yusa, Kanagawa (JP); Toshihiko Homma, Kanagawa (JP)

(73) Assignee: SEI OPTIFRONTIER CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/052,962

(22) Filed: Feb. 25, 2016

(65) Prior Publication Data

US 2016/0266315 A1 Sep. 15, 2016

(30) Foreign Application Priority Data

Mar. 10, 2015 (JP) .................................. 2015-047294

(51) Int. Cl.
*G02B 6/255* (2006.01)

(52) U.S. Cl.
CPC ......... *G02B 6/2553* (2013.01); *G02B 6/2551* (2013.01); *G02B 6/2557* (2013.01)

(58) Field of Classification Search
CPC .............................................. C03B 23/0235
See application file for complete search history.

(56) References Cited

U.S. PATENT DOCUMENTS

| 9,033,325 B2 * | 5/2015 | Iwashita | G02B 6/2553 269/32 |
| 2002/0159723 A1 * | 10/2002 | Riis | G02B 6/2551 385/95 |
| 2014/0075999 A1 * | 3/2014 | Sasaki | G02B 6/2553 65/484 |
| 2014/0083141 A1 * | 3/2014 | Iwashita | G02B 6/2553 65/484 |
| 2015/0049991 A1 * | 2/2015 | Kawanishi | G02B 6/2551 385/96 |
| 2016/0266314 A1 * | 9/2016 | Miyamori | G02B 6/2553 |

FOREIGN PATENT DOCUMENTS

| EP | 2 833 175 A1 * | 4/2015 | ............. G02B 6/255 |
| JP | 2014-119513 A | 6/2014 | |
| WO | WO2013145474 | * 3/2013 | ............. G02B 6/255 |

* cited by examiner

*Primary Examiner* — Jodi C Franklin
(74) *Attorney, Agent, or Firm* — Drinker Biddle & Reath LLP (57) ABSTRACT

A method for fusion-splicing optical fibers and a fusion splicer are provided, which enable preventing a fusion spliced portion from disconnecting when the optical fiber is removed from the fusion splicer. A fusion-splicing method for optical fibers comprises: holding optical fibers and on optical fiber holding parts respectively provided on a pair of movable stages; butting ends of optical fibers by bringing the pair of movable stages mutually closer; fusion-splicing butted optical fibers to form a fusion spliced portion S; carrying out a proof test, the proof test including applying a tension to the fusion spliced portion S by moving the pair of movable stages so as to distance them from each other; and bringing the pair of movable stages mutually closer by a predetermined distance upon completion of the proof test.

2 Claims, 8 Drawing Sheets

FUSION-SPLICING METHOD AND FUSION SPLICER

FIELD OF THE INVENTION

The present invention relates to a fusion-splicing method and a fusion splicer for splicing optical fibers by fusion.

BACKGROUND ART

Japanese patent laid-open No. 2014-119513 discloses an invention regarding a fusion splicer. According to this invention, optical fibers are put on the fiber holding parts of a fusion splicer, and thereafter its windbreak cover is closed, the optical fibers are fusion-spliced by electric arc, the fusion spliced portion is subjected to a tensile test (proof test) upon end of the electric arc, and finally, the spliced optical fiber is taken out by opening the windbreak cover.

SUMMARY OF THE INVENTION

Object of the Invention

An object of the present invention is to provide such a fusion-splicing method and a fusion splicer for optical fibers as are capable of preventing disconnection of the fusion spliced portion thereof at the time of removing a fusion-spliced optical fiber from a fusion splicer.

Means for Achieving the Object

An optical fiber fusion-splicing method of the present invention comprises: holding optical fibers on optical fiber holding parts respectively provided on a pair of movable stages; butting the optical fibers each other by bringing the pair of movable stages mutually closer; fusion-splicing the optical fibers together to form a fusion spliced portion; distancing the pair of movable stages apart from each other so as to carry out a proof test that includes applying a tension to the fusion spliced portion; and bringing the pair of movable stages into a predetermined mutually closer position upon completion of the proof test.

A method of fusion-splicing optical fibers according to the present invention comprises: holding optical fibers on optical fiber holding parts respectively provided on a pair of movable stages; butting the optical fibers each other by moving feed screws, which are provided in the pair of movable stages, from an original start position to a butting position and bringing the pair of movable stages mutually closer; forming a fusion spliced portion by fusion-splicing the butted optical fibers together; and carrying out a proof test that includes applying a tension to the fusion spliced portion by moving the feed screws to a retreat position on the original start position side from the butting position so as to distance the pair of movable stages from each other, whereas the retreat position is located at a point closer to the butting position than the original start position.

A fusion splicer of the present invention is capable of fusion-splicing optical fibers according to the optical fiber fusion-splicing method of the present invention.

Effect of the Invention

According to the present invention, it is possible to prevent disconnection of a fusion spliced portion when removing a fusion-spliced optical fiber from a fusion splicer.

BRIEF DESCRIPTION OF DRAWINGS

FIGS. 6A, 6B, and 6C are schematic views of movable stages capable of moving a fiber holder and a stub holder respectively in a fusion splicer of the present invention.

DETAILED DESCRIPTION OF THE INVENTION

Hereafter, an example of embodiment of the optical fiber fusion-splicing method and a fusion splicer concerning the present invention will be described with reference to the drawings. The drawings are provided only for the purpose of explanation, and not intended to limit the scope of the invention. In the drawings, in order to avoid duplication of explanation, the same mark indicates an identical part. The ratio of dimensions in a drawing is not necessarily exact.

Figure 1:
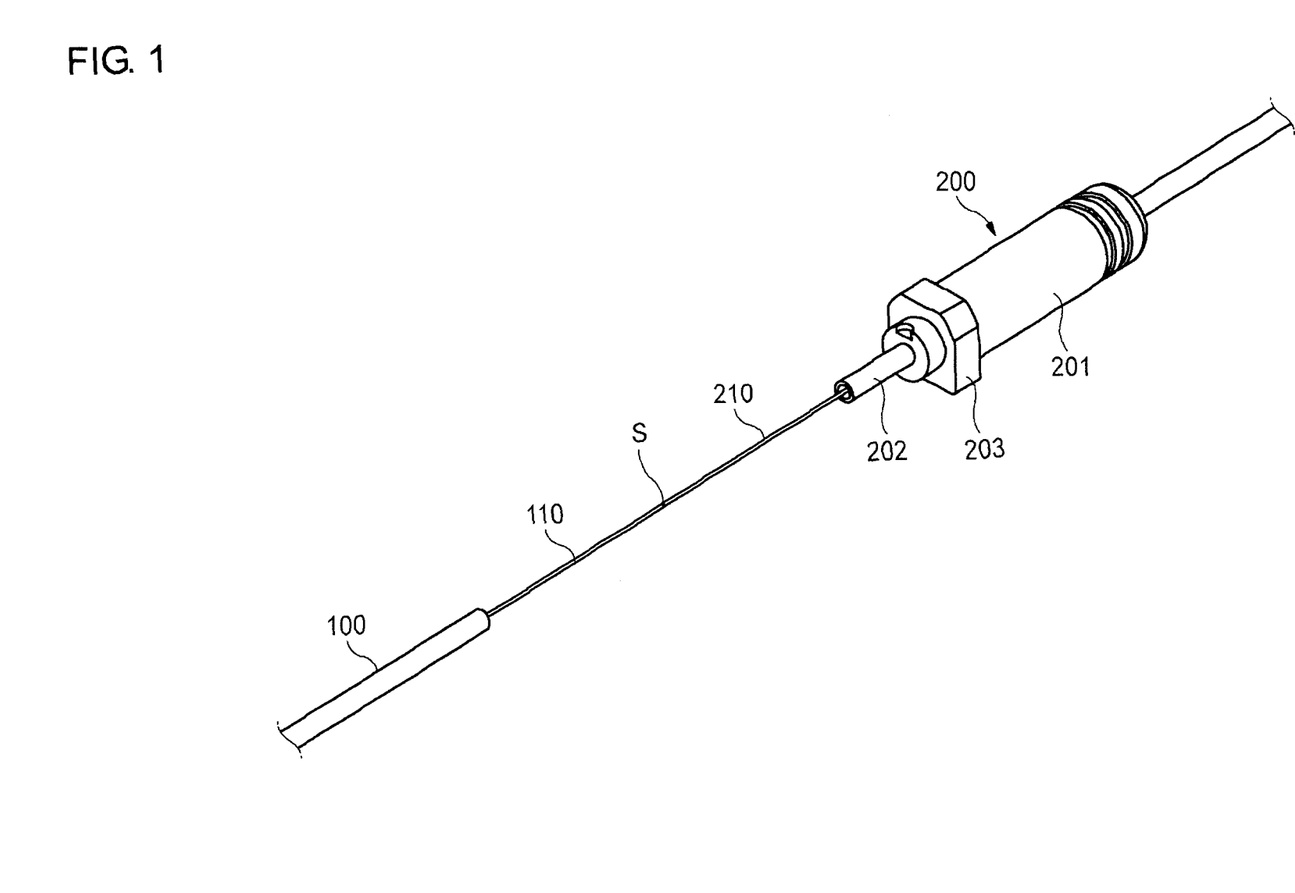
FIG. 1 shows a perspective view of an optical fiber cord and a stub, which are fusion-spliced by a fusion splicer concerning the present invention.

FIG. 1 is a perspective view showing an optical fiber cord 100 and a stub 200 which are fusion-spliced by a fusion splicer of the present invention. The optical fiber cord 100 is a cord having an outer diameter of 0.9 mm in which an optical fiber made by covering a glass fiber 110 with a covering made of ultraviolet curable resin and having a diameter of 0.25 mm is further covered with a plastic resin. The stub 200, which is a component accommodated in an unillustrated optical connector (single-core connector of fusion-splicing type suitable for field assembly), has a ferrule 201 and a fiber piece 202 inserted in the insertion hole (not illustrated) formed in the center of the ferrule 201. A metal flange 203 is provided between the ferrule 201 and the fiber piece 202 protruding from the ferrule 201. The fiber piece 202 has a glass fiber 210.

The fusion-splicing method of the present invention can be used at a site where an installation of optical fiber equipment is done, for example, in the case where the glass fiber 110 of the optical fiber cord 100 and the glass fiber 210 of the stub 200 are connected by fusion-splicing. Here, the part where the glass fiber 210 and the glass fiber 110 are connected by fusion-splicing is represented as the fusion spliced portion S. In addition, there may be a case where the glass fiber exposed at the end of an optical fiber instead of the optical fiber cord 100 is fusion-spliced with the glass fiber 210 of the stub 200.

Figure 2:
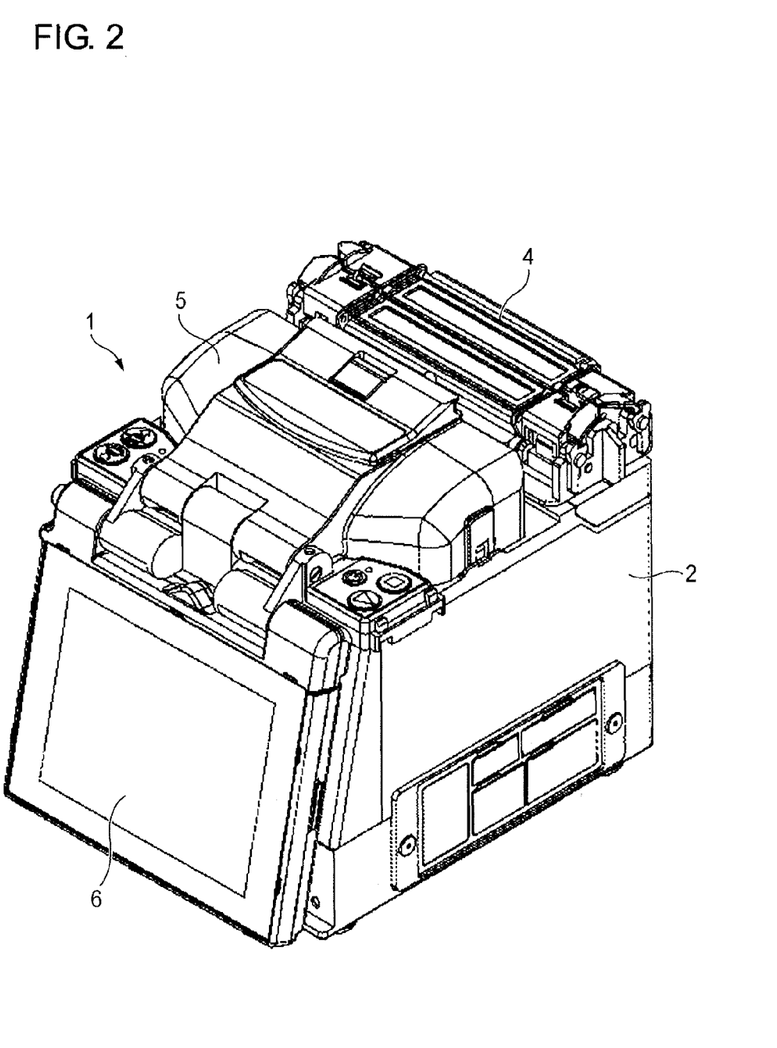
FIG. 2 shows a perspective view of a fusion splicer concerning the present invention, where its windbreak cover is closed.
Figure 3:
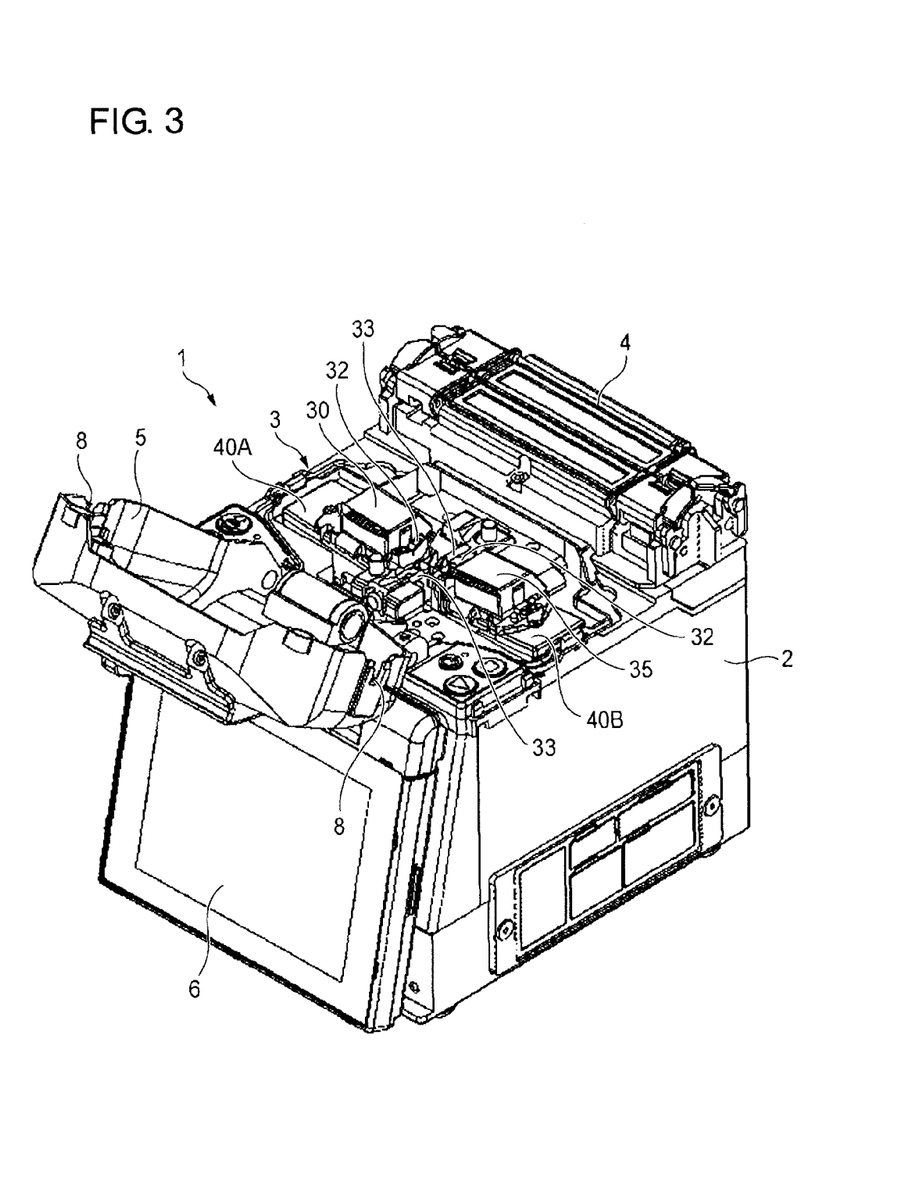
FIG. 3 shows a perspective view of a fusion splicer of FIG. 2, where its windbreak cover is open.

Next, an optical fiber fusion splicer 1 according to an embodiment of the present invention will be described. FIG. 2 is a perspective view in the state where the windbreak cover of the fusion splicer 1 is closed, and FIG. 3 is a perspective view in the state where the windbreak cover of the fusion splicer 1 is opened. The fusion splicer 1 is suitable for use, for example, when the glass fiber 110 of the optical fiber cord 100 and the glass fiber 210 of the stub 200 are fusion-spliced and the fusion spliced portion S is further reinforced in the field where an installation of optical fiber facilities is done. The fusion splicer 1 has a box-like housing 2. A fusion splicing part 3 for carrying out fusion-splicing between the glass fiber 110 of the optical fiber cord 100 and the glass fiber 210 of the stub 200 is provided on the upper part of the housing 2. Also provided there is a reinforcing part 4 for heat-shrinking a fiber reinforcement sleeve (not shown) covering the fusion spliced portion S which has been fusion-spliced at the fusion splicing part 3. Furthermore, the fusion splicer 1 has a windbreak cover 5 for preventing the blowing of wind against the fusion splicing part 3.

Moreover, the fusion splicer 1 has a monitor 6 for displaying the status of fusion-splicing of the glass fibers 110 and 210 with pictures taken by a camera (not shown) arranged inside the housing 2. The monitor 6 projects an image of the fusion-spliced part of the glass fibers 110 and 210 as photographed with a microscope having an image sensor, such as CCD, for example. The operators can perform the fusion-splicing work, looking at images of the monitor 6. The monitor 6 also functions as a controlling part for operating the fusion splicing part 3 and the reinforcing part 4, so that various kinds of operation are possible with the monitor 6.

Figure 6A:
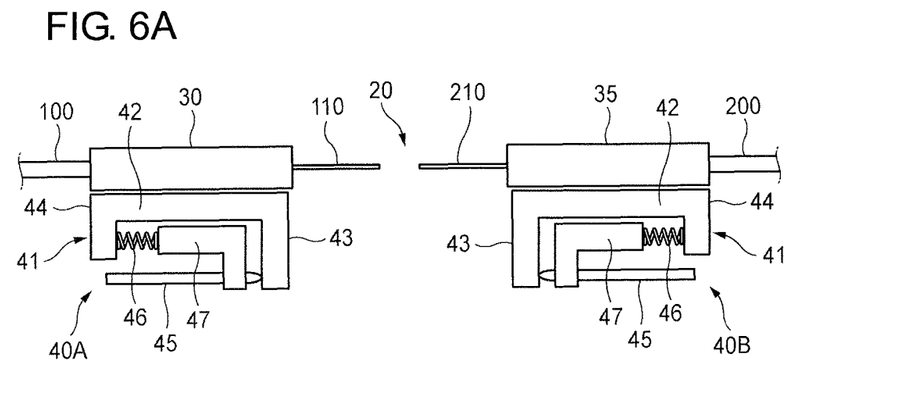
FIG. 6A shows a state in which the movable stages are distanced from each other.
Figure 6B:
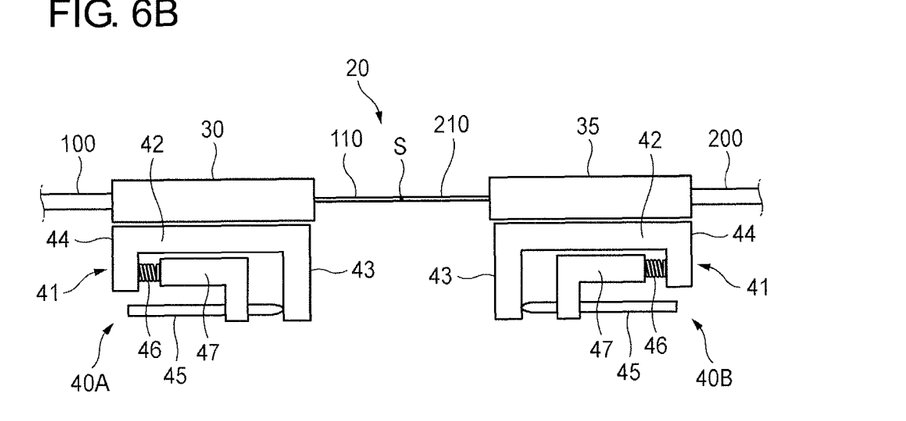
FIG. 6B shows a state in which the movable stages are moved closer to each other.
Figure 6C:
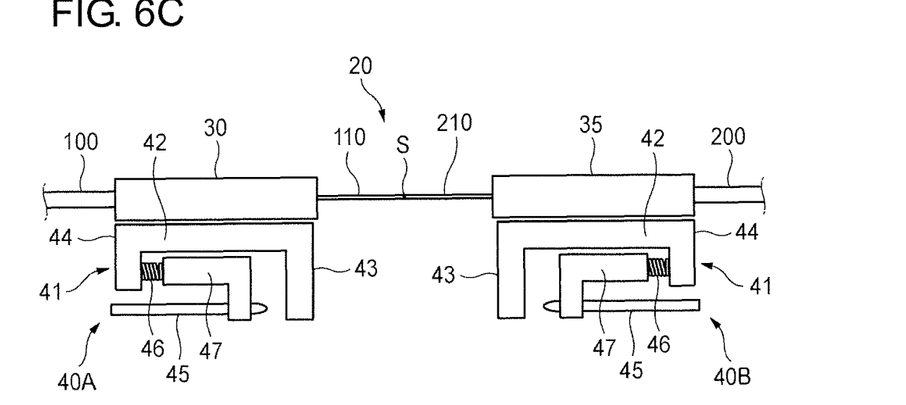
FIG. 6C shows a state in which a tension is applied to the optical fiber.

The fusion splicing part 3 includes a fiber holder 30 for holding an optical fiber cord 100 and a stub holder 35 for holding a stub 200. In addition, the fusion splicing part 3 includes a pair of fiber positioning parts 32 which are provided between the fiber holder 30 and the stub holder 35 and which are used for positioning the tip parts of the glass fibers 110 and 210 held by the fiber holder 30 and the stub holder 35, respectively. Furthermore, the fusion splicing part 3 includes a pair of arc electrodes 33 which are arranged between the fiber positioning parts 32 and which are used for fusion-splicing the tips of the glass fibers 110 and 210 by arc. The position where the arc electrodes 33 face each other is defined as "arc part 20" (FIGS. 6A, 6B, and 6C). The positioning of glass fibers 110 and 210 is made possible by the horizontal movement of the fiber holder 30 and the stub holder 35 as caused by a pair of movable stages 40A and 40B which respectively support those holders.

The windbreak cover 5 is connected with the housing 2, covering the fusion splicing part 3 in such a manner as it can freely be opened and closed. A feed port 8 for introducing the optical fiber cord 100 and the stub 200 into the fusion splicing part 3 (namely, the fiber holder 30 and the stub holder 35) is formed in each side wall part of the windbreak cover 5. Each feed port 8 is made by cutting away in an approximately rectangular form.

Figure 4:
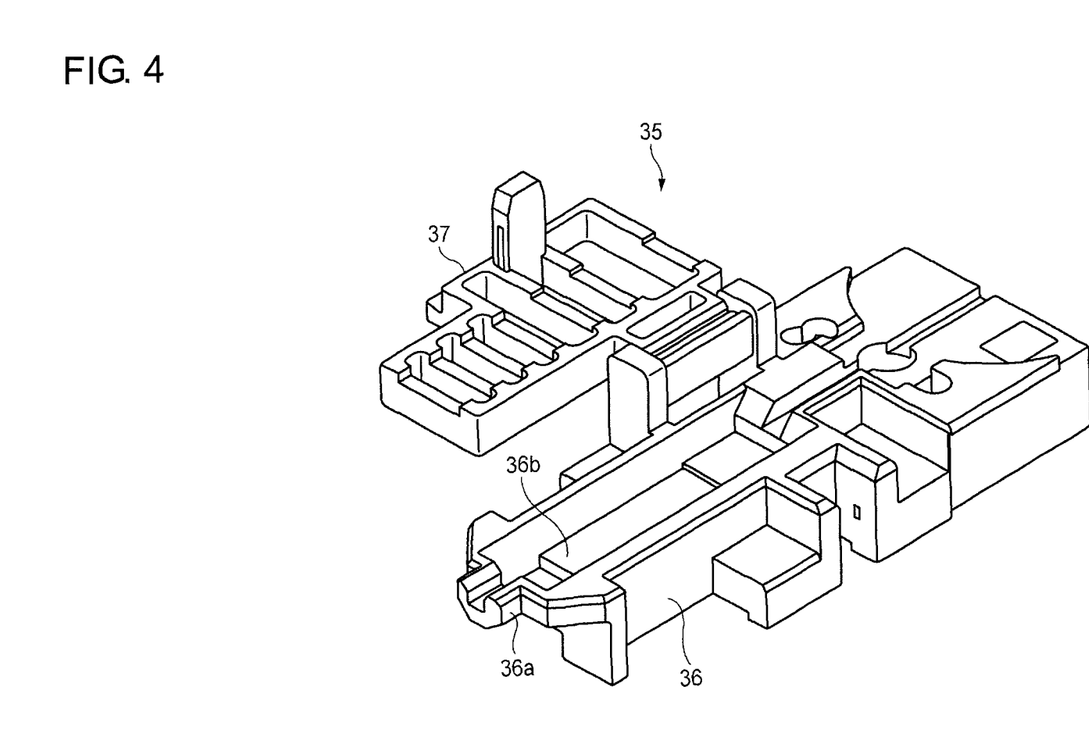
FIG. 4 shows a perspective view of a stub holder which is provided in the fusion splicer of FIG. 2.
Figure 5:
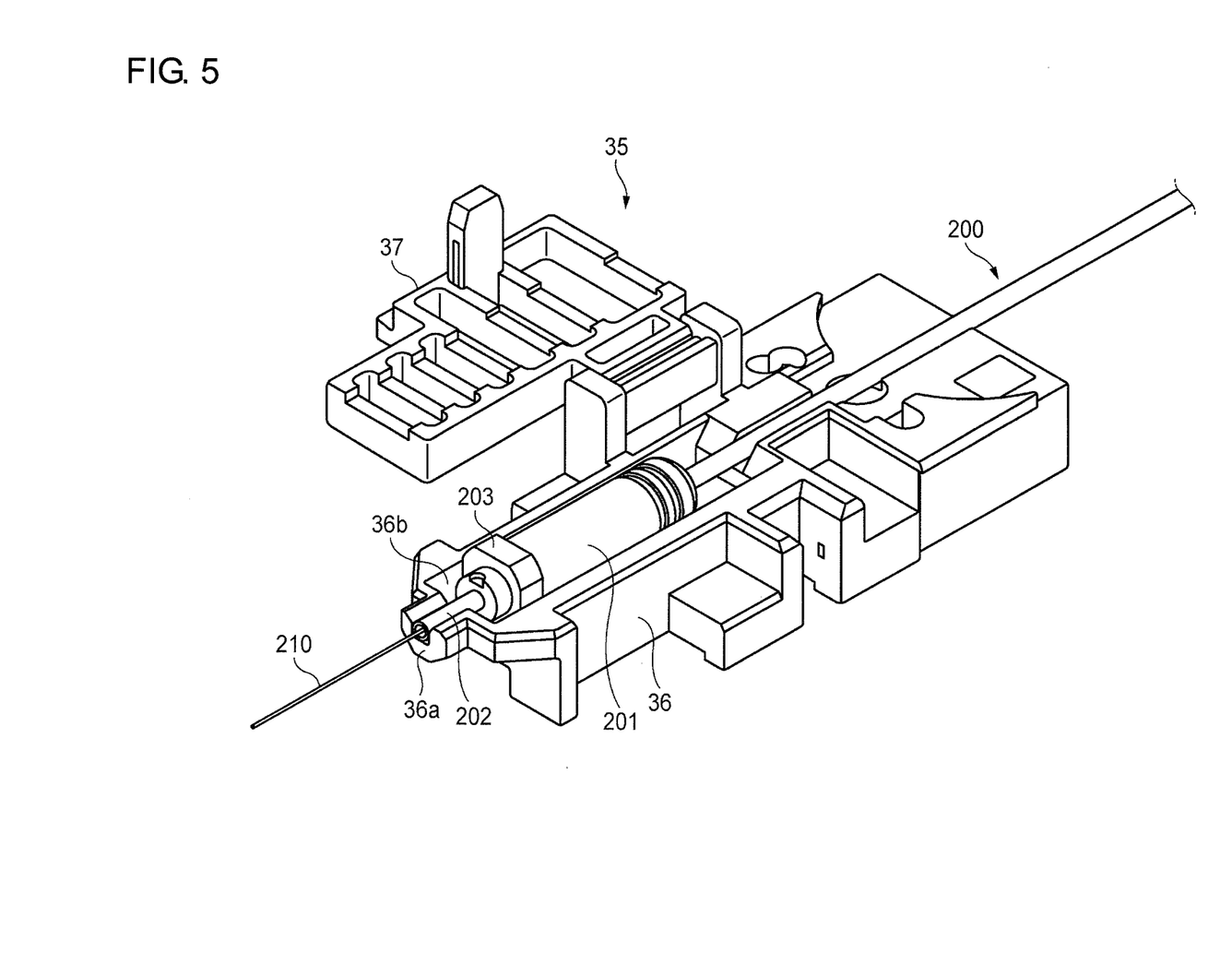
FIG. 5 shows a perspective view of the stub holder of FIG. 4 in which a stub is placed.

FIG. 4 is a perspective view of the stub holder 35 included in the fusion splicer 1 of FIG. 2. FIG. 5 is a perspective view showing the state where the stub 200 is accommodated in the stub holder 35. The stub holder 35 has a main holder part 36 and a holder lid 37, and the stub 200 can be held between the main holder part 36 and the holder lid 37. The stub holder 35 can alternately fix or release the stub 200 by closing or opening the holder lid 37 against the main holder part 36.

A glass accommodation part 36a for housing the exposed glass fiber 210 is provided protrusively at an end part of the main holder part 36. The glass accommodation part 36a is formed continuously to the ferrule accommodation part 36b for housing a ferrule 201 of the stub 200. The ferrule accommodation part 36b has an accommodation space which is larger in diameter than the interior space of the glass accommodation part 36a. A step part having a shape agreeable with the shape of the metal flange 203 formed at the end of the ferrule 201 is provided between the glass accommodation part 36a and the ferrule accommodation part 36b.

FIGS. 6A, 6B, and 6C are schematic views of movable stages 40A and 40B capable of moving a fiber holder 30 and a stub holder 35 respectively. FIG. 6A shows a state in which the movable stages are mutually distanced, FIG. 6B shows a state in which the movable stages are moved closer to each other, and FIG. 6C shows a state in which a tension is applied to the optical fiber. The movable stages 40A and 40B are provided apart from each other in the axial direction of the optical fiber cord 100 and the stub 200 which are held by the fiber holder 30 and the stub holder 35, respectively. The movable stages 40A and 40B are movable mutually independently. The movable stages 40A and 40B respectively have a stage main body 41, a feed screw 45, and a spring 46.

The stage main body 41 includes a holder installation part 42, on the upper surface of which the fiber holder 30 or the stub holder 35 is placed. In addition, the stage main body 41 includes a front wall part 43 and a rear wall part 44, which protrude downward from the side (front side) near to the arc part 20 and the side (rear side) opposite to the arc part 20, respectively.

The feed screw 45, which is provided at a lower part of the stage main body 41, is movable in the axial direction of the fiber holder 30 and the stub holder 35. More specifically, the feed screw 45 is driven by a motor (not illustrated), pushing the stage main body 41 so that the movable stages 40A and 40B may move toward the arc part 20 from the position distanced from the arc part 20. As shown in FIG. 6B, the feed screw 45 can press the front wall part 43 of the stage main body 41 from the side opposite to the arc part 20, and thereby causes the movable stages 40A and 40B to move mutually closer toward the arc part 20.

The spring 46 is a component for causing the movable stages 40A and 40B to move in the direction (the retreat direction) for distancing them from the arc part 20 by means of elasticity against the stage main body 41 pushed by the feed screw 45. The spring 46 is placed between a spring receiver 47 and the rear wall part 44 protruding downward at the rear end of the stage main body 41. The spring receiver 47, which is a component of an L-like shape, is connected to the spring 46 at its one end and is fixed in such a manner as the feed screw 45 is inserted in the lower part extending downward at its other end. Specifically, the spring 46 is a coil spring.

As shown in FIG. 6B, the spring 46 will be compressed when the feed screw 45 pushes the front wall part 43 of the stage main body 41, causing the movable stages 40A and 40B to move toward the arc part 20. On the other hand, when the feed screw 45 is moved in the direction for departing from the arc part 20 as shown in FIG. 6A, the movable stages 40A and 40B will move in the direction (the retreat direction) for distancing themselves from the arc part 20 as the compression of the spring 46 is released.

Figure 7:
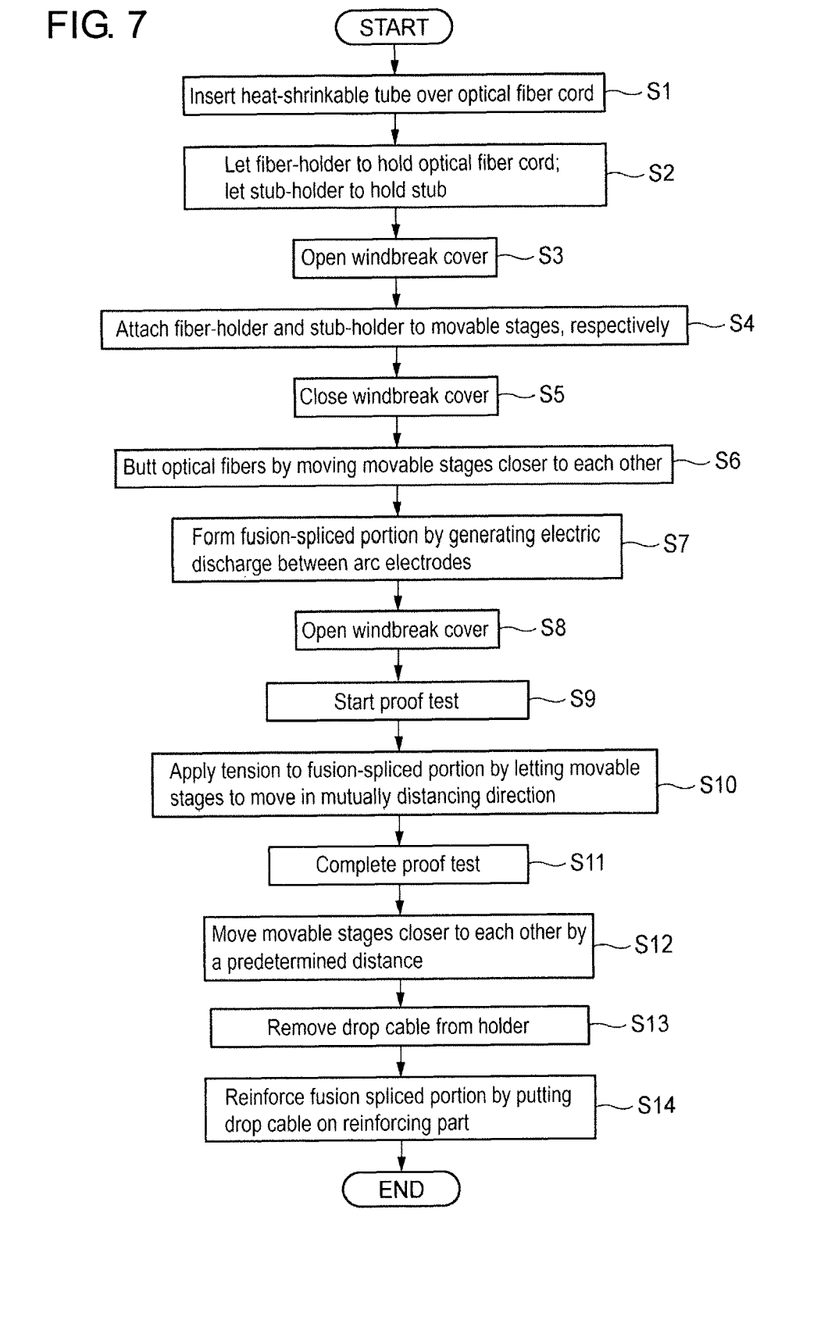
FIG. 7 is a flow chart showing a fusion-splicing method concerning a first embodiment of the present invention.

Next, a first embodiment of the fusion-splicing method of the present invention will be explained with reference to FIG. 7. FIG. 7 is a flow chart showing the first embodiment of the fusion-splicing method.

Attachment of a Fiber

First, a heat-shrinkable tube (not illustrated) is inserted over an optical fiber cord 100 which is to be connected with a stub 200 (S1). While the fiber holder 30 is caused to hold the optical fiber cord 100, the stub holder 35 is caused to hold the stub 200 (S2). Subsequently, the windbreak cover 5 for covering the fusion splicing part 3 is opened (S3), and the fiber holder 30 and the stub holder 35 are put on a pair of movable stages 40A and 40B, respectively (S4). Instead of such procedure, the optical fiber cord 100 and the stub 200 may be held directly by the fiber holder 30 and the stub holder 35 which are installed beforehand on the movable stages 40A and 40B, respectively. As a result of these procedures, the glass fiber 110 of the optical fiber cord 100 and the glass fiber 210 of the stub 200 are arranged to face each other at the fusion-splicing position of the fusion splicing part 3. Thereafter, the windbreak cover 5 is closed (S5).

Fusion-splicing

Next, in the above-mentioned conditions, the movable stages 40A and 40B are operated by the monitor 6 of the fusion splicer 1 so that the glass fibers 110 and 210 may butt each other appropriately in terms of alignment and axial adjustment. More specifically, the movable stages 40A and 40B are pushed by the feed screw 45 driven by the motor, so that the movable stages 40A and 40B move toward the arc part 20 from the position which is distanced from the arc part 20. This causes the glass fibers 110 and 210 to butt each other (S6). When the alignment and axial adjustment of the glass fibers 110 and 210 are completed, the end faces (butting parts) of the glass fibers 110 and 210 are fusion spliced by electric arc, whereby the fusion spliced portion S is formed (S7).

Proof Test

Figure 8:
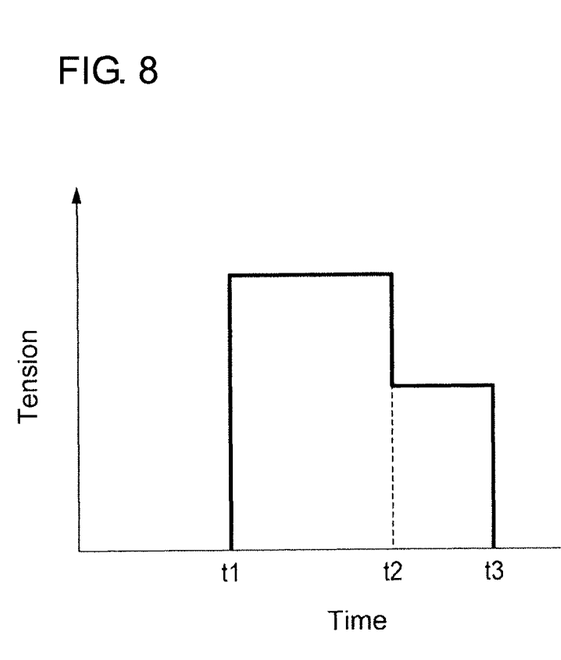
FIG. 8 is a graph showing the change of tension applied to the fusion spliced portion of an optical fiber when a proof test is carried out in the first embodiment of the fusion-splicing method concerning the present invention.

FIG. 8 is a graph showing the change of tension applied to the fusion spliced portion S of glass fibers 110 and 210 when a proof test is carried out in the first embodiment of the fusion splicer 1. In a case where the fusion spliced portion S has an air void, a crack, or the like, the tensile strength of the fusion spliced portion S may remarkably decrease and a breakage, disconnection or the like may be caused later. Therefore, a proof test is performed in a manner in which the fiber holder 30 and the stub holder 35 are moved backward while they hold the optical fiber cord 100 and the stub 200 after the fusion-splicing of the glass fibers 110 and 210, and thereby a tension is applied to the fusion spliced portion S so that a poorly connected part of the glass fibers 110 and 210 may be fractured beforehand.

More specifically, when the fusion-splicing of the glass fibers 110 and 210 is completed, the windbreak cover 5 is opened (S8), and a proof test is started (S9). When the proof test is started, the feed screws 45 are moved in a direction for distancing themselves from an arc part. At that time, the feed screw 45 is returned to the original start position as shown in FIG. 6C. This causes the compression of springs 46 to be released and the springs 46 to push the stage main body 41, whereby the pair of movable stages 40A and 40B move in a direction (retreat direction) for distancing themselves from the arc part 20 (S10). Thus, by causing the movable stages 40A and 40B to retreat so as to pull the glass fibers 110 and 210 from both sides, a tension of about 200 [gf], for example, is applied to the fusion spliced portion S of the glass fibers 110 and 210 (Time t1 of FIG. 8). The proof test is completed after a predetermined time has lapsed under the conditions where the tension is given to the fusion spliced portion S (S11). When the proof test is accomplished, the fusion spliced portion S is still in the state where the required tension is applied.

In this embodiment, the proof test is started after the windbreak cover 5 is opened. However, the proof test may be started in a manual setting by pushing a start switch for proof test through a monitor, etc. under the condition where the windbreak cover 5 is closed, and thereafter the windbreak cover 5 may be opened after the completion of the proof test.

Upon completion of the proof test (Time t2 of FIG. 8), the movable stages 40A and 40B are moved closer to each other at a predetermined distance by moving the feed screw 45 toward the arc part 20 so as to slightly push the stage main body 41 (S12). This slightly loosens the tension given to the fusion spliced portion S. In such case, as shown in FIG. 8, the tension applied to the fusion spliced portion S becomes slightly smaller from the tension given to the fusion spliced portion S at the time of the proof test.

Removal of an Optical Fiber

The lid part of the fiber holder 30 and the holder lid 37 of the stub holder 35 are opened under the condition where the movable stages 40A and 40B are moved closer to each other at a predetermined distance. By opening the lid part of the fiber holder 30, the hold of the optical fiber cord 100 is released in the fiber holder 30. Also, by opening the holder lid 37 of the stub holder 35 (Time t3 of FIG. 8), the hold of the stub 200 is released in the stub holder 35. This will result in the state where no tension is applied to the fusion spliced portion S as show in FIG. 8. Thereafter, the optical fiber cord 100 is removed from the fiber holder 30, and the stub 200 is removed from the stub holder 35 (S13).

Reinforcement Process

Upon completion of the proof test, a reinforcement component (not illustrated) is arranged along the fusion spliced portion S of the glass fibers 110 and 210, and further it is covered with a heat-shrinkable tube (not illustrated). Thereafter, the fusion spliced portion S which is covered with the heat-shrinkable tube is arranged inside the reinforcing part 4, and the heat-shrinkable tube is caused to shrink by a heater provided in the reinforcing part 4. Thus, the fusion spliced portion S of the glass fibers 110 and 210 is reinforced by the covering formed as a result of unification of the reinforcement component and the heat-shrinkable tube (S 14).

When the holder lid 37 of a stub holder 35 is opened to remove a stub 200 from the stub holder 35 after completion of the fusion-splicing between the glass fiber 110 of an optical fiber cord 100 and the glass fiber 210 of the stub 200, there is occasionally a case where if a tension applied to the fiber cord 100 and the stub 200 remains as it is, the stub 200 leaps up inadvertently because the end (metal flange 203) of the ferrule 201 of the stub 200 is caught in the step part provided between the glass accommodation part 36a of the stub holder 35 and the ferrule accommodation part 36b. For example, in the case of fusion-splicing according to the method set forth in Japanese patent laid-open No. 2014-119513, the fusion spliced portion S may be disconnected because of such jump of the stub 200.

In the first embodiment, a pair of movable stages 40A and 40B are structured to move closer to each other at a predetermined distance after the completion of a proof test. According to this structure, the tension applied to the fusion spliced portion S can slightly be reduced before the lid part 31 of the fiber holder 30 and the holder lid 37 of the stub holder 35 are opened. That is, as shown in FIG. 8, the tension applied to the fusion spliced portion S can be released gradually. Therefore, when the holder lid 37 of the stub holder 35 is opened to remove the stub 200, the stub 200 will not leap up, and therefore the disconnection and breakage of the fusion spliced portion S can be prevented.

Second Embodiment

Figure 9:
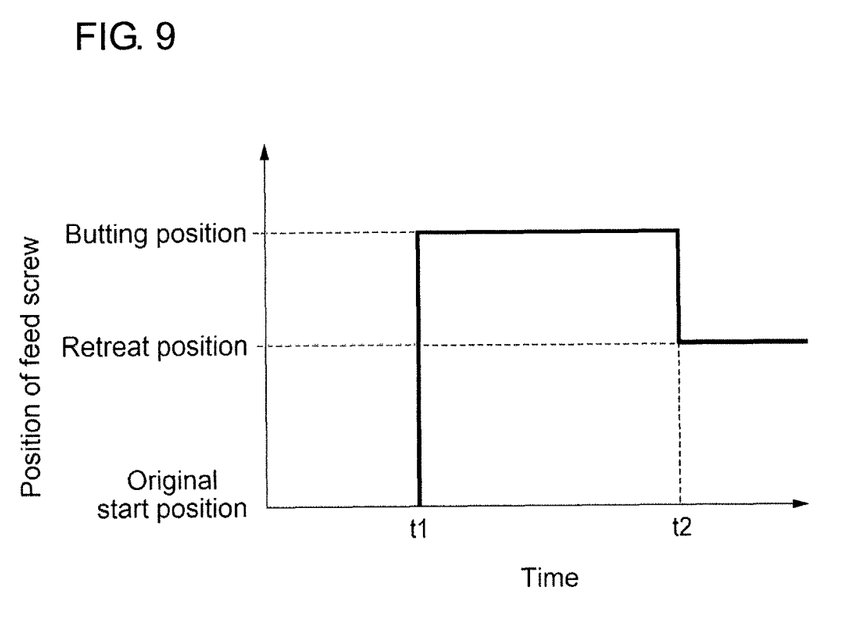
FIG. 9 is a graph showing change in movement quantity of a feed screw when a proof test is carried out with respect to a second embodiment of the fusion-splicing method concerning the present invention.

FIG. 9 is a graph showing changes in the movement position of a feed screw when a proof test is carried out in the second embodiment. In the second embodiment also, as in the first embodiment, when a fusion-splicing process is started, the feed screw 45 is moved to the butting position shown in FIG. 6B from the original start position shown in FIG. 6A (Time t1 of FIG. 9). This brings a pair of movable stages 40A and 40B closer to each other. And, after the glass fibers 110 and 210 are mutually butted, the end faces of the glass fibers 110 and 210 are fusion-spliced by electric arc, whereby the fusion spliced portion S is formed.

Subsequently, a proof test is started. In the second embodiment, the feed screw 45 is moved to a retreat position from the butting position of FIG. 6B at the time of starting the proof test (Time t2 of FIG. 9). Such retreat position is a position which is closer to the butting position than the original start position of FIG. 6C, and the feed screw 45 is still pushing the front wall part 43 at the retreat position. This will result in release of compression of the spring 46 and make the pair of movable stages 40A and 40B to move in the direction for distancing themselves from the arc part 20, thereby applying a tension to the fusion spliced portion S. The proof test is completed after a predetermined time has elapsed under the conditions where the tension remains applied to the fusion spliced portion S. After completion of the proof test, the feed screw 45 still remains as arranged in the retreat position, and the tension applied to the fusion spliced portion S remains as it is. Thereafter, the optical fiber cord 100 is removed from the fiber holder 30, and the stub 200 is removed from the stub holder 35. Finally, the reinforcement process of the fusion spliced portion S is performed.

According to the method of second embodiment, at the time of starting a proof test, the feed screw 45 is moved to a retreat position from a butting position, so that a pair of movable stages 40A and 40B may retreat, distancing each other so as to apply a tension to the fusion spliced portion S. According to this structure, a proof test is done under the conditions in which the front wall parts 43 are pushed by the feed screws 45. Thus, as compared with the conventional method, the tension applied to the fusion spliced portion S can be more restrained at the time of the proof test. Therefore, when the holder lid 37 of the stub holder 35 is opened to remove the stub 200 after the completion of the proof test, the stub 200 will not leap up, and the disconnection and fracture of the fusion spliced portion S can be prevented.

Evaluation of the Second Embodiment

In order to evaluate the second embodiment, a proof test was performed, changing the quantity (stage retreat quantity) of movement done by a pair of movable stages in the direction for distancing each other at the time of starting the proof test, and the rate of stub jumping which occurred at the time of removing a stub from a stub holder upon completion of the proof test was evaluated. First, a case where the movable stages were returned to their original start positions at the time of starting the proof test was evaluated as a comparative example. In the comparative example, the proof test was carried out under the condition that the amount of stage retreat from the butting position was set to 1,000 µm, which was the original start position. As a result, in the comparative example, the rate of occurrence of stub jumping at the time of removing the stub from the stub holder upon completion of the proof test was 100%. On the other hand, the case where the movable stages were returned to the retreat position, which was closer to the butting position than the original start position, at the time of starting a proof test was evaluated as an example of the embodiment. In the case of the embodiment, the proof test was carried out under the condition that the amount of stage retreat from the butting position was set to 400 µm on the proximal side than the original start position. As a result, in the case of the embodiment, the rate of occurrence of the stub jumping was 0%, and the disconnection rate of the fusion spliced portion was also 0%.

As described above, it was confirmed that a fusion spliced portion can be prevented from disconnection or fracture if a feed screw is moved to a retreat position (a position closer to the butting position than the original start position, that is, a state in which the front wall part is pushed by the feed screw) from the butting position at the time of starting a proof test, whereby the amount of stage retreat is made smaller than the conventional method, so that a stub does not leap up when the stub is removed from a stub holder upon completion of the proof test.

Heretofore, the present invention has been described with reference to specific embodiments in detail. However, it would be obvious to a person skilled in the art that various changes and modifications are possible without deviating from the sprit and scope of the present invention. The number of structural part, position, form, etc. are not limited to those mentioned in the above embodiments and can be modified into suitable ones as needed to carry out the present invention.

What is claimed is:

1. An optical fiber fusion-splicing method comprising:
    holding optical fibers on optical fiber holding parts respectively provided on a pair of movable stages positioned with feed screws provided in the pair of movable stages at an original start position, each optical fiber holding part including: a first part provided at an end part of the holding part and having an interior space; a second part provided continuously to the first part and having an accommodation space which is larger in diameter than the interior space; and a step part provided between the first part and the second part;
    butting the optical fibers each other by moving the feed screws from the original start position to a butting position so as to bring the pair of the movable stages mutually closer;
    fusion-splicing the butted optical fibers together to form a fusion spliced portion;
    carrying out a proof test, the proof test including applying a tension to the fusion spliced portion by moving the feed screws towards the original start position so as to distance the pair of movable stages apart from each other;
    moving the feed screws to a retreat position on the butting position side from the original start position so as to bring the pair of movable stages mutually closer by a predetermined distance upon completion of the proof test, thereby loosening the tension, and
    removing the optical fibers from the optical fiber holding parts positioned with the feed screws at the retreat position.

2. A method of fusion-splicing optical fibers comprising:
    holding optical fibers on optical fiber holding parts respectively provided on a pair of movable stages positioned with feed screws provided in the pair of movable stages at an original start position, each optical fiber holding part including: a first part provided at an end part of the holding part and having an interior space; a second part provided continuously to the first part and having an accommodation space which is larger in diameter than the interior space; and a step part provided between the first part and the second part;

butting the optical fibers each other by moving the feed screws from the original start position to a butting position so as to bring the pair of the movable stages mutually closer;

fusion-splicing the butted optical fibers together to form a fusion spliced portion;

carrying out a proof test, the proof test including applying a tension to the fusion spliced portion by moving the feed screws to a retreat position on the original start position side from the butting position so as to distance the pair of movable stages from each other, and removing the optical fibers from the optical fiber holding parts positioned with the feed screws at the retreat position, wherein the retreat position is located at a point closer to the butting position than the original start position.

* * * * *